United States Patent
Alderson et al.

(10) Patent No.: US 7,960,651 B2
(45) Date of Patent: Jun. 14, 2011

(54) WIRING DEVICE AND COVER PLATE SNAP-ON ASSEMBLY

(75) Inventors: David Alderson, Morganton, NC (US); Michael D. Williams, Morganton, NC (US); Clifford G. Martin, Newton, NC (US)

(73) Assignee: Leviton Manufacturing Company, Inc., Melville, NY (US)

( * ) Notice: Subject to any disclaimer, the term of this patent is extended or adjusted under 35 U.S.C. 154(b) by 120 days.

(21) Appl. No.: 11/744,637

(22) Filed: May 4, 2007

(65) Prior Publication Data

US 2008/0017398 A1 Jan. 24, 2008

Related U.S. Application Data

(60) Provisional application No. 60/807,686, filed on Jul. 18, 2006.

(51) Int. Cl.
*H02G 3/14* (2006.01)
*H05K 5/03* (2006.01)

(52) U.S. Cl. .............. 174/66; 174/67; 174/53; 220/241; 220/242; D13/177

(58) Field of Classification Search .......... 174/66, 174/67, 50, 53, 57, 58, 480, 481; 220/3.2–3.9, 220/241, 242; 439/535, 536; D13/177, 156
See application file for complete search history.

(56) References Cited

U.S. PATENT DOCUMENTS

| | | | |
|---|---|---|---|
| 2,934,590 A | 8/1958 | Thompson et al. | |
| 3,908,235 A | 9/1975 | Telliard et al. | |
| 4,534,486 A | 8/1985 | Eidson | |
| 4,631,354 A * | 12/1986 | Boteler | 174/66 |
| 5,073,681 A * | 12/1991 | Hubben et al. | 174/66 |
| 5,180,886 A * | 1/1993 | Dierenbach et al. | 174/66 |
| 5,189,259 A * | 2/1993 | Carson et al. | 174/66 |
| 5,449,860 A | 9/1995 | Buckshaw et al. | |
| 5,895,888 A * | 4/1999 | Arenas et al. | 174/66 |
| 6,501,022 B2 * | 12/2002 | Victor | 174/66 |
| 6,679,725 B2 * | 1/2004 | Kidman | 174/66 |
| 6,923,663 B2 * | 8/2005 | Oddsen et al. | 439/535 |
| 7,071,414 B2 * | 7/2006 | Kim | 174/66 |
| 7,077,706 B1 * | 7/2006 | Yang | 174/66 |
| 7,102,081 B2 * | 9/2006 | Xu et al. | 174/66 |
| 7,211,727 B2 * | 5/2007 | Pearse et al. | 174/53 |
| 7,435,903 B2 * | 10/2008 | Tufano et al. | 174/66 |
| 2005/0257951 A1 | 11/2005 | Xu et al. | |
| 2006/0086525 A1 | 4/2006 | Xu et al. | |

OTHER PUBLICATIONS

International Search Report dated Feb. 19, 2008.
"Product Catalog for Cheetah U.S.A. Corporation 2006-2007." Sandy, Utah.

* cited by examiner

*Primary Examiner* — Angel R Estrada
(74) *Attorney, Agent, or Firm* — Collard & Roe, P.C.

(57) ABSTRACT

The present invention relates to an installation of a wiring device configured to receive a cover plate which snaps on to a wiring device such as a switch or receptacle. With this invention, openings for threaded fasteners in the face of the cover plate are eliminated. In an embodiment, the cover plate has an opening sized to accommodate a wiring device and supports, on opposing side walls of the opening, at least one protrusion. The protrusions on the cover plate are located to detachably engage corresponding protrusions on the wiring device as the cover plate is pressed onto the wiring device.

14 Claims, 8 Drawing Sheets

WIRING DEVICE AND COVER PLATE SNAP-ON ASSEMBLY

This application claims priority pursuant to 35 U.S.C. 119 (e) from U.S. Provisional Application having Application No. 60/807,686 filed Jul. 18, 2006.

BACKGROUND OF THE INVENTION

1. Field of the Invention

This invention relates generally to an assembly of flush mounted wiring devices and more particularly to a wiring devices configured to receive a cover plate.

2. Description of the Prior Art

Prior art cover plates are usually in the form of a substantially flat plate having one or more openings which provide access to a wiring device within a wall box. The purpose of the cover plate is to provide a protective cover for the electrical box installation while preventing exposure of a user to the electrical wires in the interior of the electrical box. The term wiring device refers to, but is not limited to on-off switches, receptacles, outlets, dimmers motor speed control switches and the like. Wiring devices include a metal ground/mounting strap having two openings at each end, one being an oversize mounting opening for mounting the wiring device to an electrical box and the other a threaded opening for fastening the cover plate to the ground/mounting strap with screw fasteners. The oversize mounting openings permit the wiring device to be horizontally positioned while being mounted to a wall box.

The use of screws to attach a plate to a wiring device requires the installer to first align the openings in the cover plate with the threaded openings in the ground/mounting strap, then insert small screws through the cover plate and tighten the screws with a screw driver. The heads of the screws used to attach the cover plate to the wiring device are exposed and, therefore, may detract from the overall appearance of the cover plate. Currently, cover plates which are composed of plastic material are in widespread use. Thus, the use of screws to attach a plastic wall plate to the ground/mounting strap of a wiring device may cause the cover plate to fracture if the screws be over tightened.

What is needed is a wiring device having a frame, or housing which can be quickly and easily coupled to a cover plate by an installer without the use of screws.

SUMMARY OF THE INVENTION

The present invention relates to an assembly of wiring devices configured to receive a cover plate which snaps on to the frame of a wiring device such as a switch or receptacle. With this invention, openings for threaded fasteners in the face of the cover plate are eliminated. In an embodiment, the cover plate has an opening sized to accommodate a wiring device and supports, on opposing side walls of the opening, at least one protrusion. The protrusions on the cover plate are located to detachably engage corresponding protrusions on the wiring device as the cover plate is pressed onto the wiring device.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, feature and advantages of the present invention will become more fully apparent from the following detailed description, the appended claim and the accompanying drawings in which similar elements are given similar reference numerals where:

DETAILED DESCRIPTION OF THE INVENTION

Figure 1:
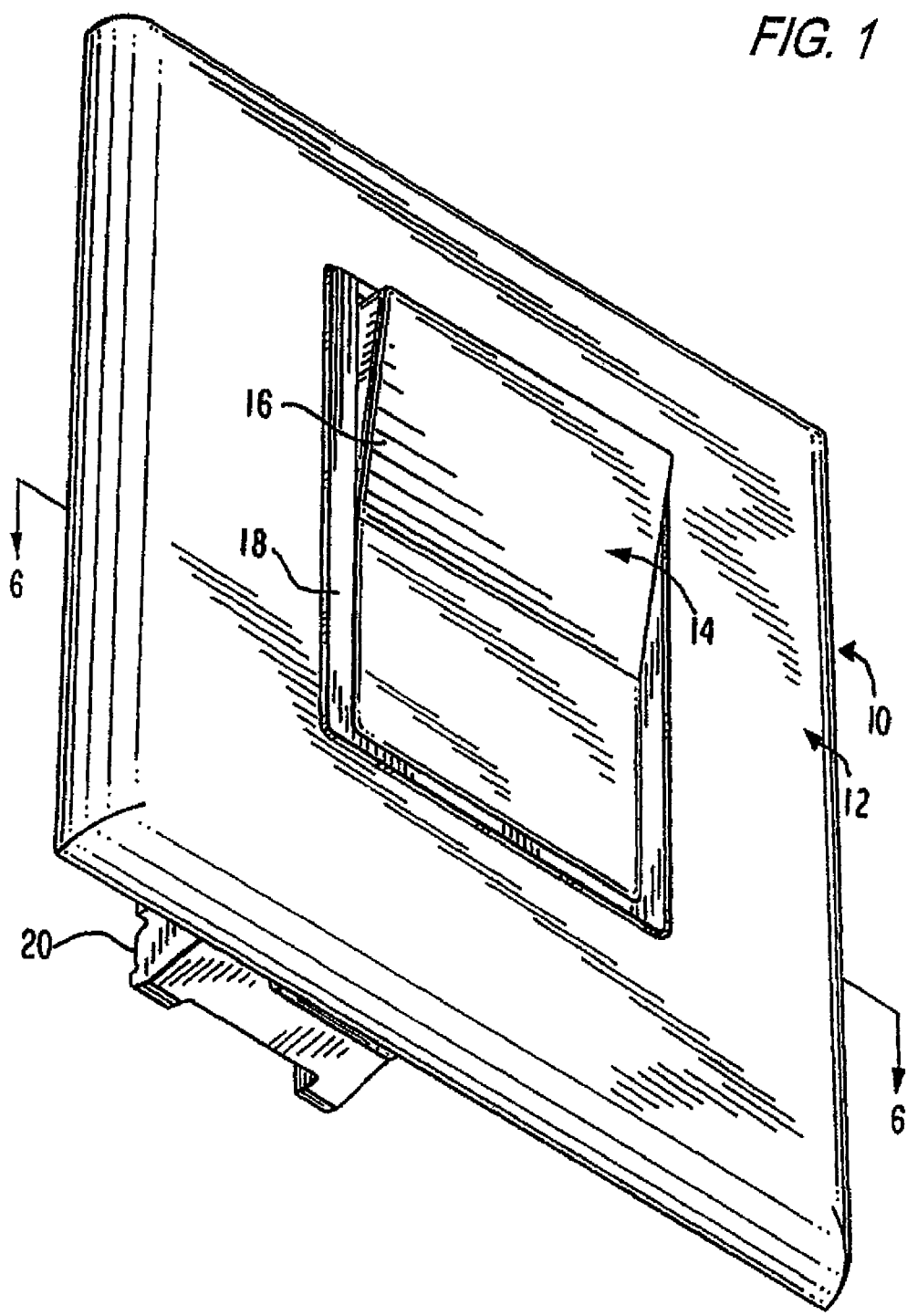
FIG. 1 is a perspective view of an on-off switch coupled to a cover plate in accordance with the principles of the invention.
Figure 2:
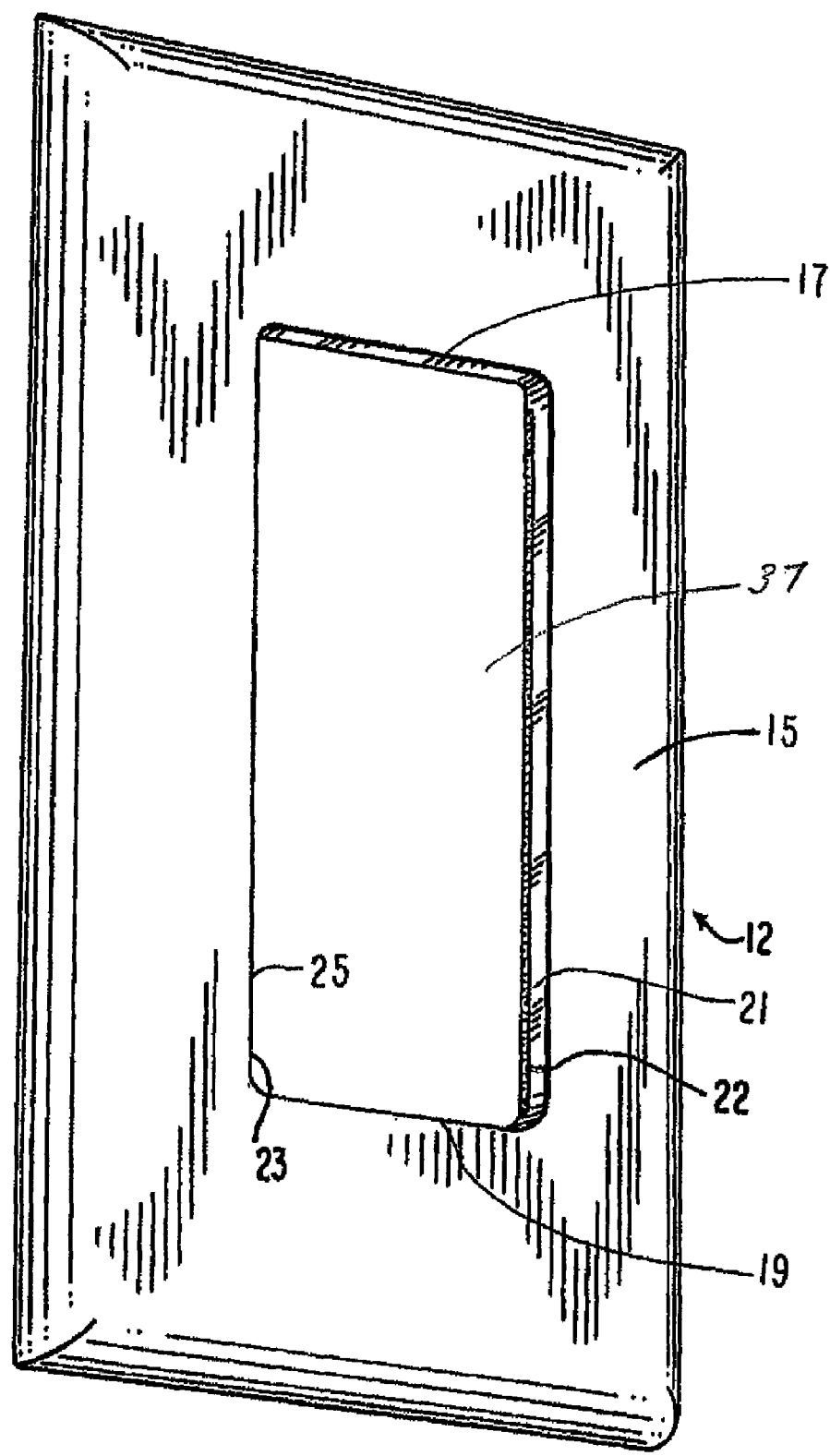
FIG. 2 is a perspective view of the cover plate of FIG. 1.
Figure 3:
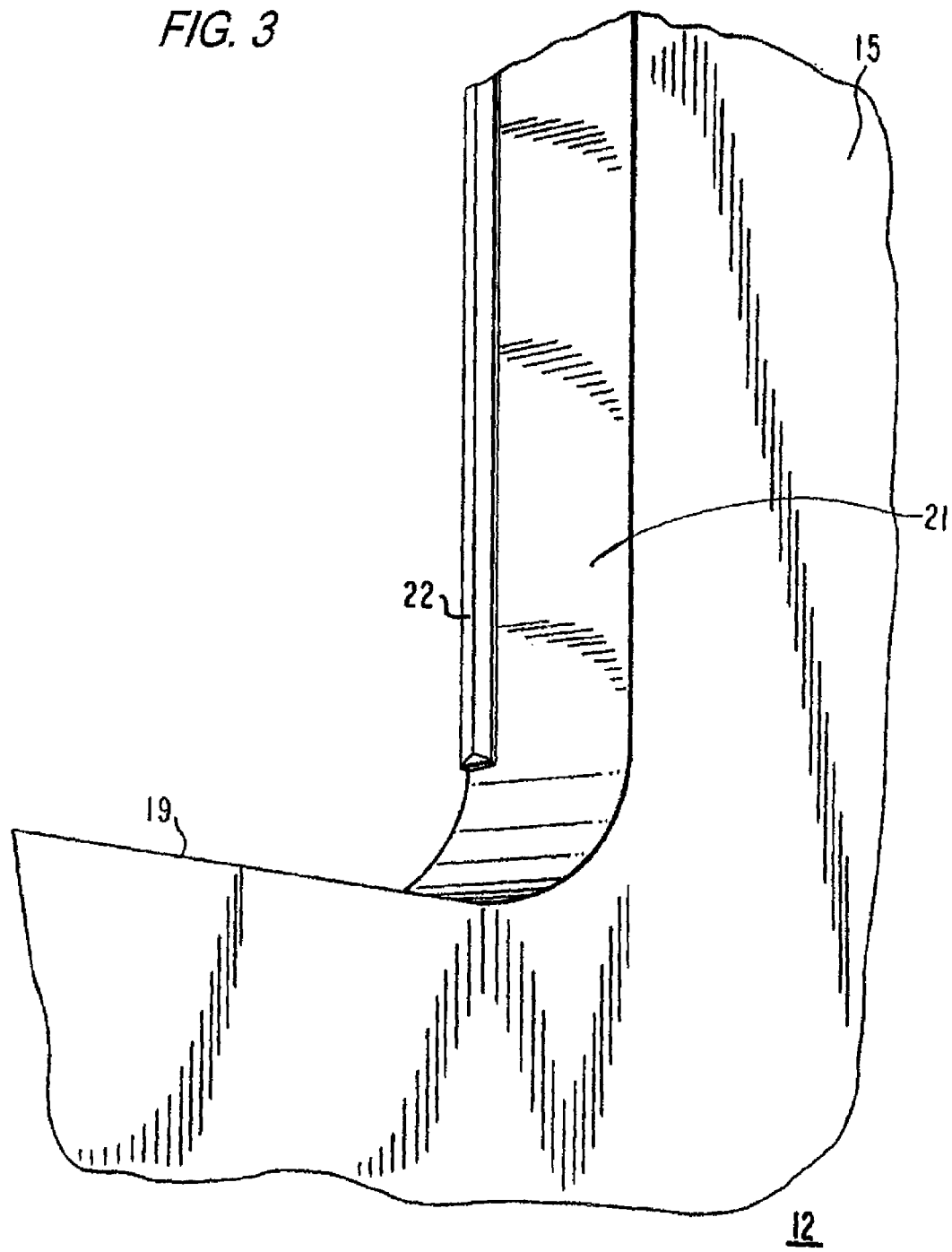
FIG. 3 is a detailed view of an inside corner of the opening in the cover plate of FIG. 2 showing a protrusion for engaging a protrusion on a wiring device.

FIG. 1 shows an electrical wiring device and cover plate assemblage 10 in accordance with an embodiment of the invention. As described below, cover plate 12 is securely coupled to the wiring device 14 without requiring either threaded fasteners or openings in the face of the cover plate. Referring to FIGS. 2 and 3, cover plate 12 has a rectangular aperture 37 defined by vertical wall 21, 25 and horizontal walls 17, 19. Vertical wall 21 supports a first shaped protrusion 22 and vertical wall 25 supports a second shaped protrusion (not shown). A wiring device, which can be an on-off switch 14 (see FIGS. 4 and 5) having a rocker paddle 16 located within a frame 18 for example, supports protrusions 24, 26, 28 disposed on upper and lower ends on the left side wall 32 of the frame 18 of the wiring device and similar structure on the right side wall 36 of the frame 18. The protrusion 22 (see FIGS. 6, 6A and 7) on the right side wall 21 of the aperture in cover plate 12 is positioned to mate with frame protrusions 24, 26, 28 on the right side wall 36 of the frame 18 of the on-off switch 14 and, in a similar manner, the cover plate protrusion 23 on the left side wall 25 of the aperture in cover plate 12 is positioned to mate with the frame protrusions 24, 26, 28 on the left side wall 32 of the frame 18 of the on-off switch.

Referring to FIG. 1, in a typical application, the on-off switch 14 electrically couples a power source to a load to control the power to the load. The switch 14 includes a frame 18, a switch paddle actuator 16 and a switch housing 20. The housing 20, which includes a ground/mounting strap, supports wiring contact assemblies (e.g., screws) for connection to power conductors (e.g., phase, neutral and ground) of an electrical wiring system such as a standard alternating current (AC) 120 Volts, 60 Hz power source, typically found in residential homes and commercial buildings. Although a rocker type of switch paddle actuator 16 is shown, another type of actuator such as a slider, rotatable knob etc. can be used. In addition, while the electrical wiring device 14 is shown as a switch, the invention here disclosed can be equally applied to a receptacle, a dimmer or other type of wiring device.

Figure 4:
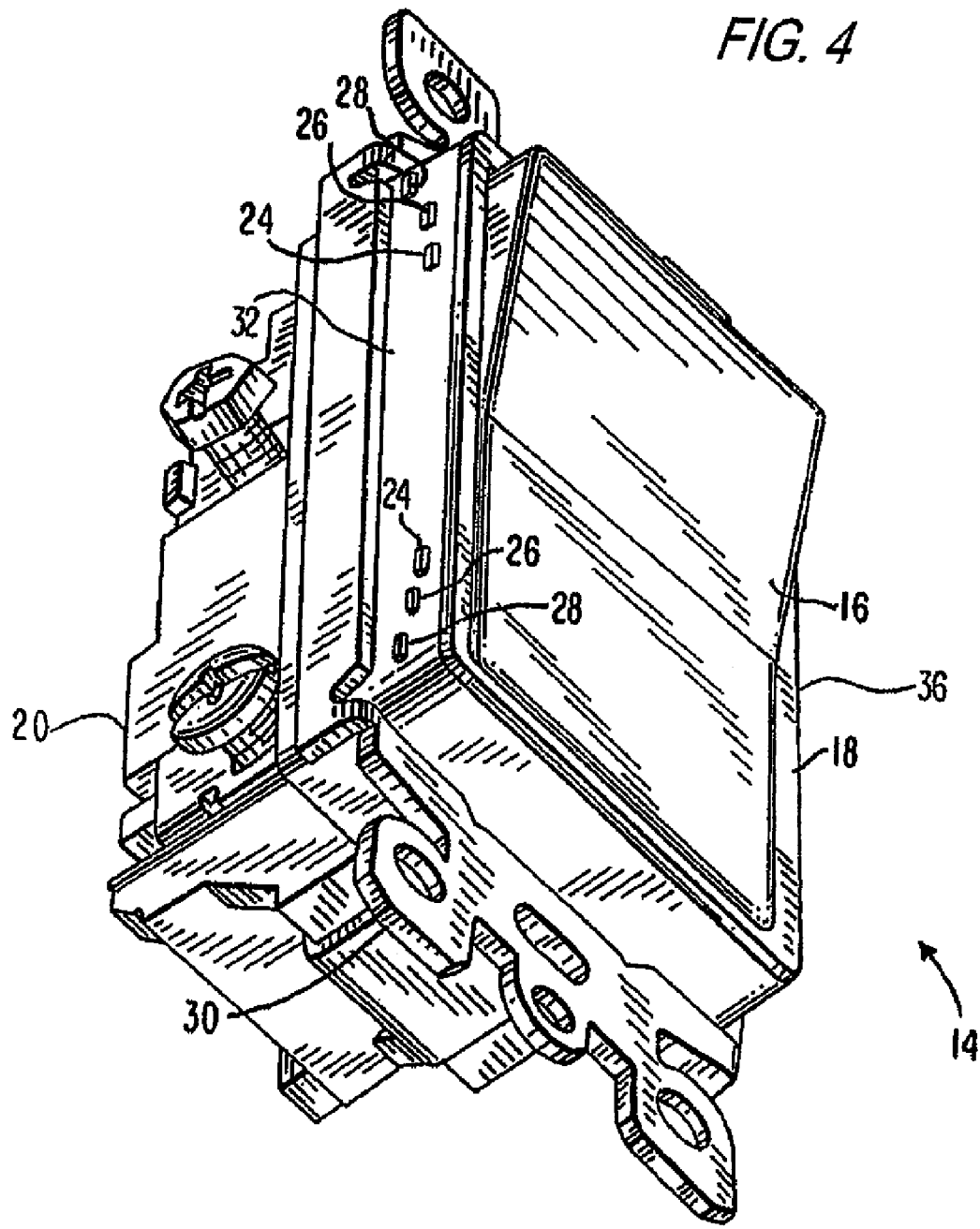
FIG. 4 is a perspective view of a wiring device showing a series of protrusions for engaging the protrusion on the cover plate.
Figure 5:
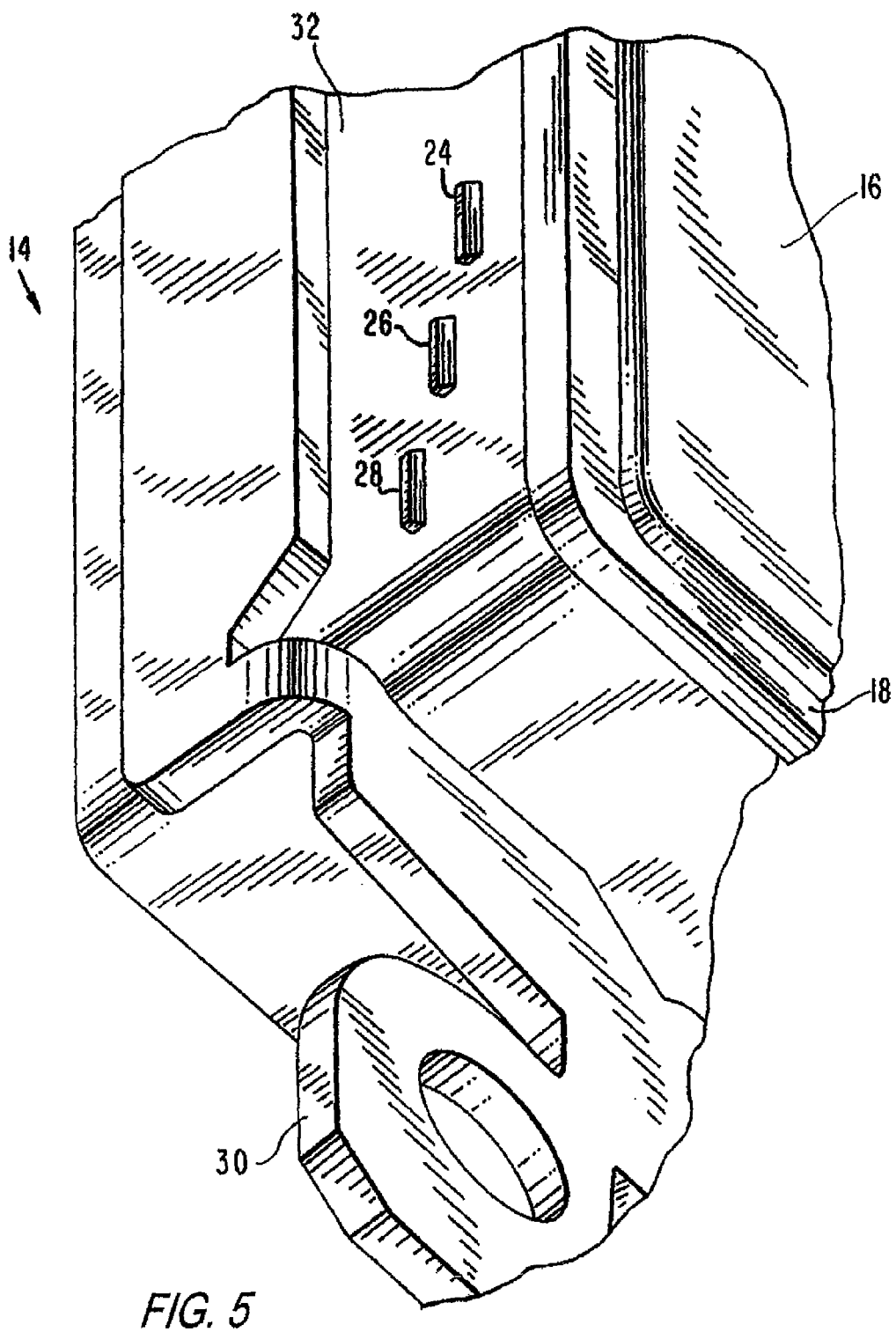
FIG. 5 is a detailed view of a corner portion of FIG. 4 showing the protrusions on the wiring device.

FIG. 3 shows a more detailed view of the protrusion on the vertical wall of the aperture of the cover plate 12, and FIG. 5 shows a more detailed view of the protrusions 24, 26 and 28 on the left side wall of the frame 18 of the switch 14. Referring to FIGS. 2 and 3, the cover plate 12 of the present embodiment has a front face surface 15 with a generally rectangular shaped central aperture 37 having vertical and horizontal walls. The aperture is sized to be positioned around the frame 18 (FIGS. 4 and 5) of the switch 14. The aperture in the cover plate 12 has a top wall 17, a bottom wall 19, a left side wall 21 and a right side wall 25. These walls are generally perpendicular to the front surface 15 of the cover plate and extend back from the front face surface of the cover plate. A cover plate protrusion 22 is disposed on the left side wall 21 along the vertical (longitudinal) axis of the cover plate 12 and a second protrusion 23 (not shown) is disposed in a similar manner on the right side wall 25 of the cover plate. Each protrusion 22 and 23 can be a strip of plastic having a cross section which is substantially triangular, half circular, triangular, equilateral triangular, or another suitable cross section.

Referring to FIGS. 4 and 5, the switch assembly 14 includes a ground/mounting strap 30 located between the housing 20 and the switch frame 18. The frame 18 of the present embodiment has a generally rectangular shape defined by a top wall, a bottom wall and two side walls. Each side wall supports two sets of frame protrusions 24, 26, 28, one set being located on the upper end of the side wall and the second set being located on the lower end of the side wall 36. Each frame protrusion 24, 26, 28 can have a horizontal wall 27, an angled ramp shaped wall 29 and a vertical wall 31. Each protrusion can have a cross section which is trapezium, semicircular, trapezoid, or another suitable cross section. The sets of frame protrusions are arranged along the side walls 32, 36 of the frame 18 to engage respective wall plate protrusions 22, 23 (FIGS. 2 and 3) on the cover plate. The frame protrusion 24, 26, 28 are shown arranged in a stair or off set step like fashion, but can be arranged in another configuration such as in an aligned arrangement. The triangular shaped cover plate protrusions 22, 23 (FIGS. 2 and 3), which are shown being disposed on the side walls 21, 25 can be repositioned to be disposed on the top and bottom walls 17, 19 of the cover plate and the sets of frame protrusions can be located on the top and bottom wall of the wiring device. The protrusion 22 on the cover plate 12 (FIGS. 2 and 3) is shown as a single linear triangular shaped members located to engage frame protrusions 24, 26, 28 on right side wall 36. However, it is understood that protrusion 22 can be two or more separate segments as long as they are located to engage the frame protrusions 24, 26, 28. The cover plate 12, the housing 20 and the switch frame 18 are normally made of non-conductive material such as plastic or other material, and the ground/mounting strap 30 is made of conductive material such as cold rolled steel, aluminum or other material.

Figure 6:
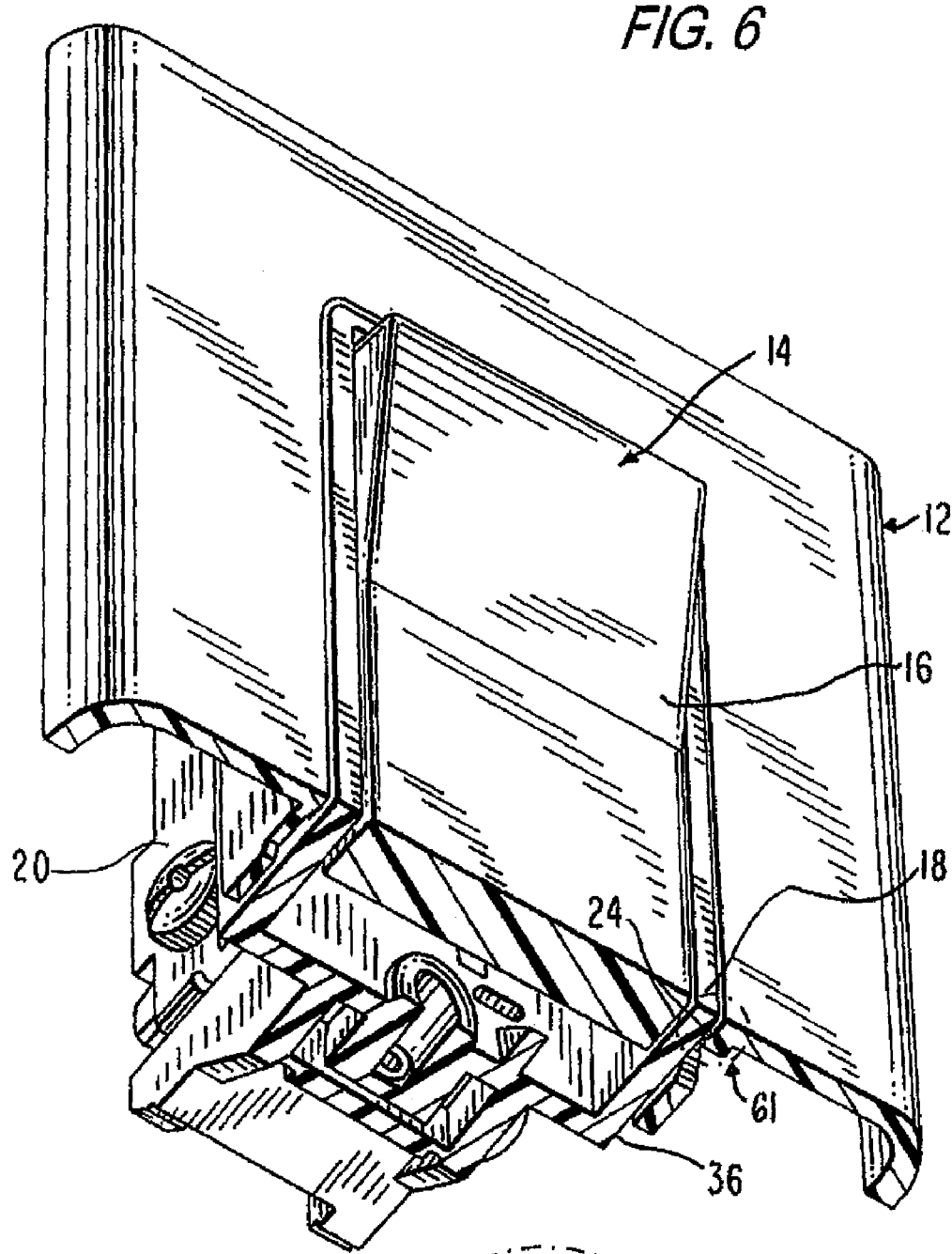
FIG. 6 is a perspective partial cut-away sectional view along line 6-6 of FIG. 1 showing the cover plate coupled to the wiring device.
Figure 6A:
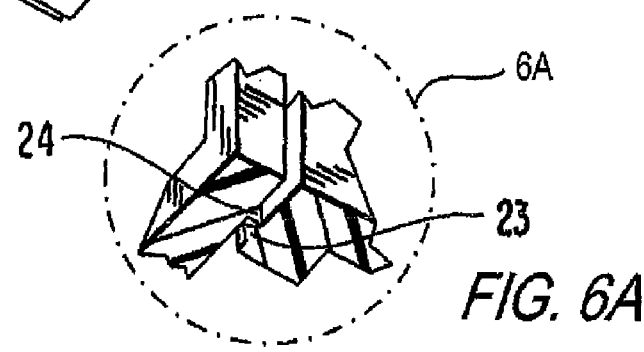
FIG. 6A is an exploded perspective view of circled section 61 of FIG. 6.
Figure 7:
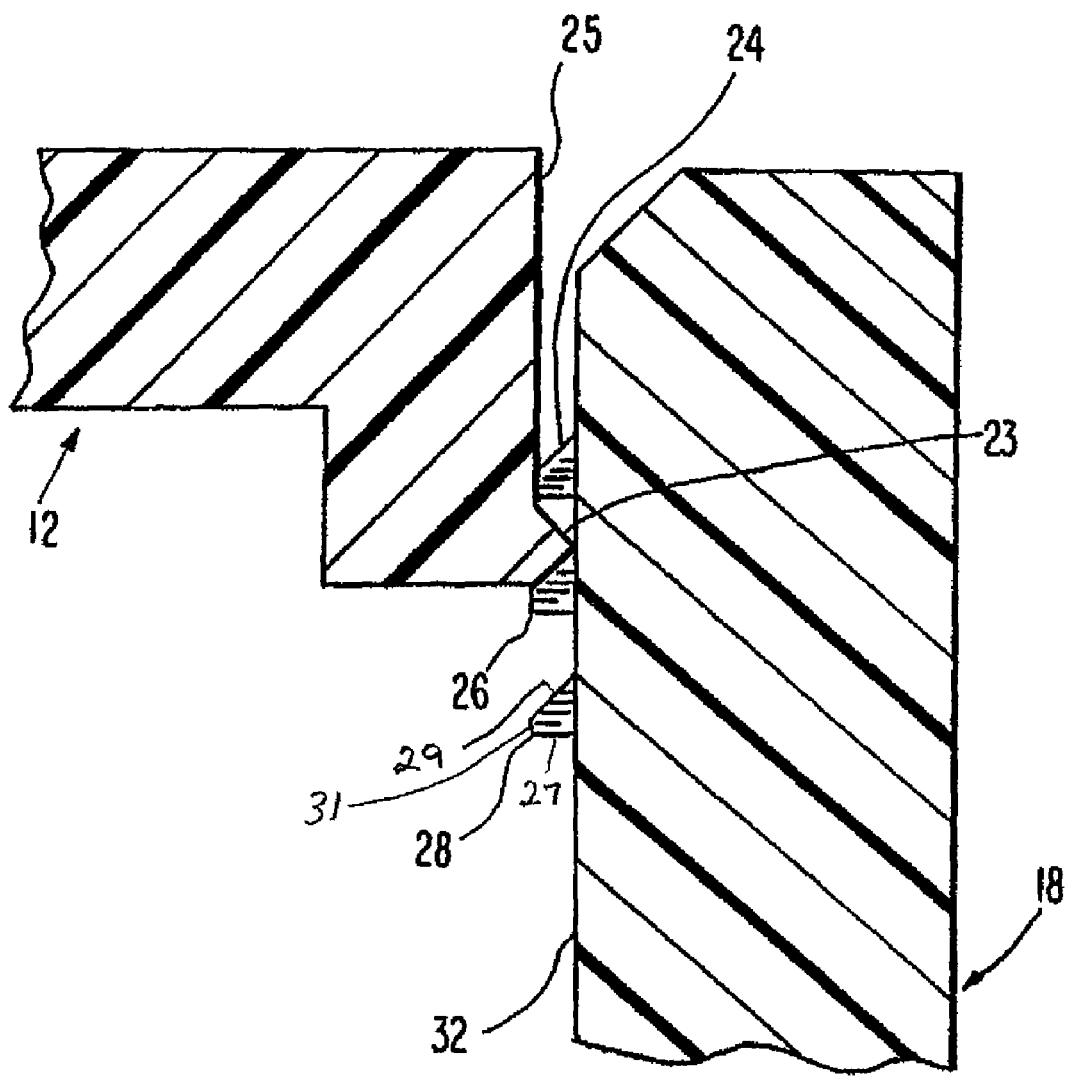
FIG. 7 is a detailed view showing the protrusion on the cover plate engaging the protrusion on the wiring device.

FIGS. 6 and 7 show detailed views of the cover plate 12 coupled to the switch frame assembly 14. A description of the coupling of the left side of the cover plate to the frame protrusions 24, 26, 28 on the left side wall 32 of the switch is provided. The coupling between the right side of the cover plate to the frame protrusion 24, 26, 28 on right side wall 36 of the switch is similar and, therefore, is not described. The side walls 21, 25 of the cover plate 12 are slightly flexible whereas the side walls 32, 36 of the frame 18 are rigid. Therefore, as the cover plate is pushed onto the switch, the protrusions 22, 23 on the cover plate 12 first make contact with the angled ramp shaped wall 29 of the first protrusion 24 of each set of protrusions on the frame 18. As the cover plate is pushed further, protrusions 22, 23 on the respective side walls 21, 25 of the cover plate yield slightly to pass over protrusions 24 and then spring back to their original position. The cover plate protrusions 22, 23 are shown having an angled ramp shaped wall on the front and a horizontal wall on the back, but another shape can be employed. The cover plate protrusions 22, 23 may be of the same material as the cover plate and can be formed with the cover plate or can be attached to the cover plate. The protrusions 24, 26, 28 on side walls 32, 36 of the switch are shown having a ramp shape wall on the front surface and a vertical wall on the back surface, but other shapes can be employed. Similar to the cover plate protrusions 22, 23, the switch protrusions 24, 26, 28 can be an integral part of the switch by molding the protrusion to the switch frame during the molding step. However, in some instances it may be desirable that the cover plate protrusions 22, 23 and the frame protrusions 24, 26, 28 are made from a more flexible material such as a yieldable plastic or rubber or the like so that they flex as they contact each other.

Referring to FIG. 7, a description is now provided of the coupling mechanism between the cover plate 12 and the switch assembly 14. In the description which follows, it is assumed that the switch assembly 14, and therefore the switch frame 18 is securely mounted to an electrical junction box and that a user wishes to attach or mount the cover plate 12 to the switch assembly. The opening 37 of the cover plate 12 is placed over the switch assembly 14 so that rear surface of the cover plate faces the front face of the switch assembly and the opening in the cover plate is aligned with the front face of the switch assembly. The cover plate 12 is then advanced towards the switch assembly 14 so that the rear surface of the cover plate protrusion 23 is brought into contact with the angled ramp shaped wall of the first frame protrusion 24. As noted above, the side wall of the cover plate 12, or the protrusion itself is slightly flexible and the side wall of the frame 18 is comparatively rigid. Therefore, in one embodiment, as the cover plate 12 is urged further towards the frame, the side wall of the cover plate or the protrusion on the cover plate yields by flexing and/or bending slightly to allow the cover plate protrusion 23 to pass over the first frame protrusion 24. Once the cover plate protrusion 23 passes over the first frame protrusion 24, the cover plate protrusion 23 ends up behind protrusion 24 and in front of the angled ramp shaped wall of the second frame protrusion 26.

At this time the cover plate is securely coupled to the switch frame assembly without the need for openings in the cover plate and threaded fasteners such as screws. Depending upon the position of the wall surface relative to the face of the switch, the cover plate 12, it may be possible to urged the cover plate further towards the frame to cause the cover plate protrusion 23 to pass over the second frame protrusion 26 and rest between the second frame protrusion 26 and the third frame protrusion 28. In either instance, the front surface of the cover plate will be parallel with the front surface of the switch frame. Although not shown, if desired the cover plate can be mounted to the frame at an angle (i.e., not parallel) by urging one end portion of the cover plate towards the frame while holding the opposite end of the cover plate fixed. This feature is can be used when the wall upon which the switch assembly 14 is installed is not parallel with the front surface of the frame.

To further illustrate the present invention, it will now be assumed that a user wants to remove the cover plate 12 from the switch assembly 14 and that the cover plate protrusions are located between the first and second frame protrusions 24, 26. To remove the cover plate, the user first grasps the cover plate 12, usually at the bottom or the top, and urges the end away from the assembly. This will cause the front surface of the cover plate protrusion 23 to move away from the second protrusion 26 and towards the rear surface of the first frame protrusion 24. As noted above, the side wall of the frame 18 is comparatively rigid and the side wall of the cover plate 12 and/or the cover plate protrusion can flex. As the cover plate 12 is pulled away from the wall, the side wall of the cover plate flexes slightly allowing the cover plate protrusion 23 to pass over the first frame protrusion 24. As the cover plate protrusion 23 passes over the first frame protrusion 24 the cover plate becomes detached from the switch assembly 14.

Figure 8:
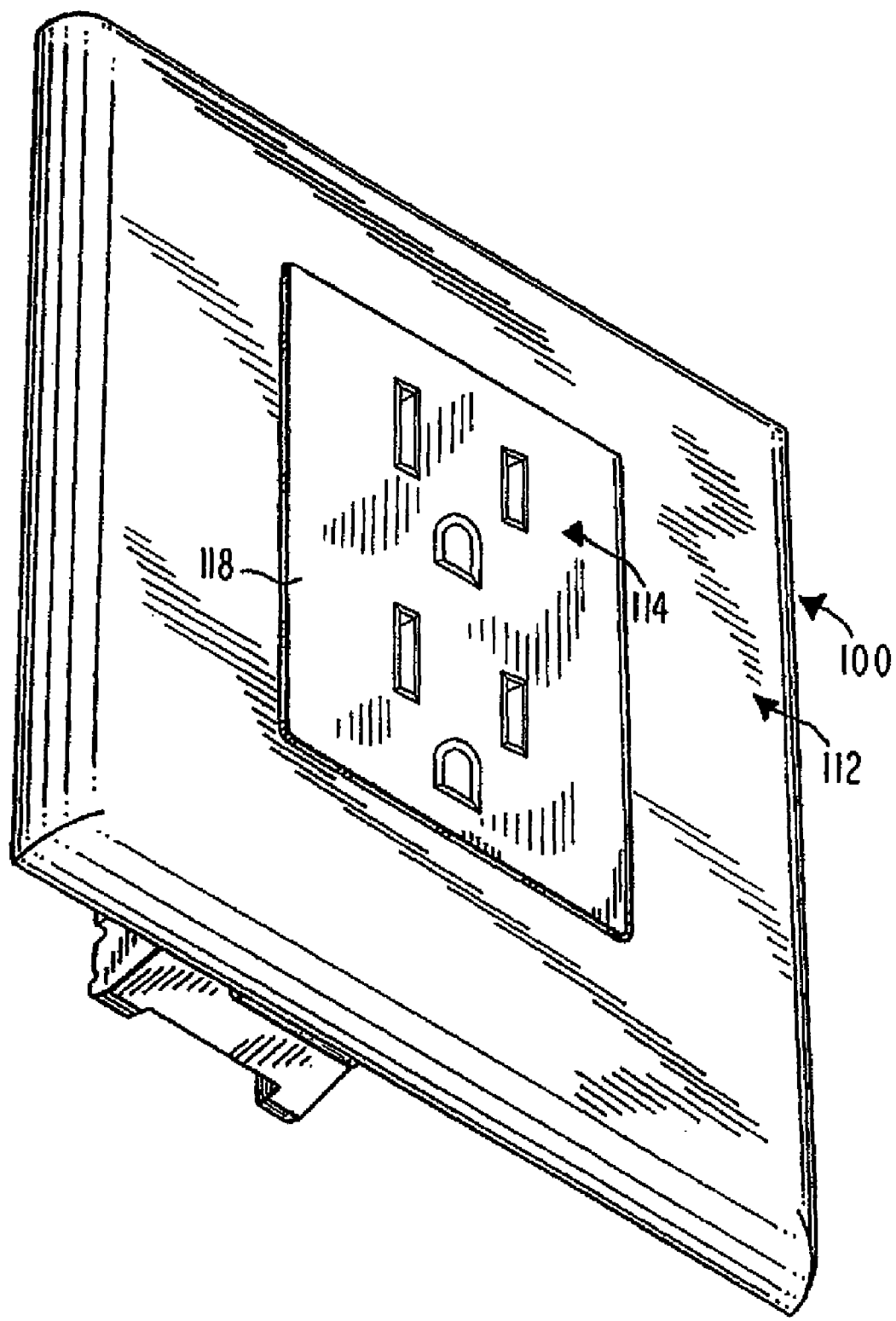
FIG. 8 is a front perspective view of a receptacle coupled to a cover plate in accordance with the principles of the invention.

FIG. 8 shows a cover plate and receptacle assembly 100 in accordance with an embodiment of the invention. The assembly 100 is similar to the assembly 10 of FIG. 1 except that the wiring device is a receptacle. The receptacle 114 shown as a duplex receptacle having openings for accepting the blades (phase and neutral) and ground pins of two plugs. The assembly 100 is a receptacle frame and cover plate snap-on assembly which does not have openings in the front face of cover plate or fasteners such as screws to hold the cover plate to the receptacle. The assembly 100 incorporates the techniques of the present invention as described above and, therefore, is not repeated here.

Although a rocker switch and a receptacle are shown in the figures, this invention would apply equally well to any wiring device and cover plate assembly including but not limited to a toggle switch, a standard duplex receptacle, a dimmer, a timer, etc. In addition, while a rocker switch is described in detail with a frame around the rocker, such a separate frame is not needed and the edge of any wiring device can be used and a frame is not required as a distinct element.

While there have been shown and described and pointed out the fundamental novel features of the invention as applied to the preferred embodiment, it will be understood that various omissions and substitutions and changes of the form and details of the apparatus illustrated and in its operation may be made by those skilled in the art, without departing from the spirit of the invention.

What is claimed is:

1. A wiring device covering assembly comprising:
a frame having at least two sides and being formed integral with the wiring device, said frame having at least two protrusions disposed on an outer face of said frame with a first protrusion being disposed on a first side and a second protrusion being formed on said a second side;
a cover plate having an aperture sized to receive the wiring device, the aperture being defined by at least two walls comprising a first wall and a second wall; and
at least two cover plate protrusions with a first protrusion located on a first wall, and a second protrusion located on a second wall, said protrusions being adapted to detachably engage said protrusions on the outer face of said frame of the wiring device wherein said cover plate protrusions and said frame protrusions form mateable protrusions.

2. The cover plate of claim 1 where the aperture in the cover plate is centrally located, and is defined by a first wall, a second wall, a third wall, and a fourth wall, a first protrusion located on one of the walls, and a second protrusion located on another one of the walls, the protrusions being adapted to detachably engage a wiring device.

3. The cover plate of claim 2 for a wiring device wherein the first protrusion is located on the first wall and the second protrusion is located on the third wall, where the first wall is opposite the third wall and the protrusions are adapted to detachably engage a wiring device.

4. The cover plate of claim 3 wherein the protrusions on the first and second walls have a cross section which is substantially triangular.

5. The cover plate of claim 4 wherein each protrusion further comprises: two side members which project from the walls and are angled toward each other to have a cross section which is a triangle.

6. The cover plate of claim 5 wherein the cross section of each protrusion is an equilateral triangle.

7. The wiring device covering assembly as in claim 1, further comprising a strap disposed around an exterior portion of said frame and wherein said at least two protrusions on said frame are configured to be coupled to said at least two protrusions on said cover plate after the wiring device is installed into a junction box.

8. A wiring device comprising:
a housing for the wiring device having a top surface,
a top wall, a bottom wall and two side walls, each wall extending down from the top surface and the top surface being accessible to a user, a first set of protrusions and located on an outside surface of one of the side walls,
a second set of protrusions located on the other side wall, wherein each set of protrusions comprises three protrusions arranged in offset steps and each protrusion of each set is adapted to be detachably engaged by at least one protrusion on a cover plate.

9. The apparatus of claim 8 wherein each protrusion of each set of protrusions has a cross-section which is a trapezium.

10. The wiring device covering assembly as in claim 8, further comprising a strap disposed around an exterior portion of said frame.

11. A wiring device covering assembly comprising:
a frame formed integral with the wiring device;
a cover plate having an aperture sized to receive the wiring device, the aperture being defined by at least one wall, wherein said cover plate has at least two protrusions disposed on at least two different inside faces; and
a lock for selectively locking the frame to the cover plate wherein at least a portion of said lock is formed integral with the frame and on an outside face of said frame.

12. The wiring device covering assembly as in claim 11, wherein said lock comprises at least one protrusion.

13. The wiring device covering assembly as in claim 12, wherein said lock comprises a first set of protrusions on said frame and a second set of protrusions on said cover plate for mateingly engaging each other when said cover plate is snapped onto said frame and wherein said first set of protrusions on said frame are configured to be accessible to a corresponding second set of protrusions on said coverplate when the wiring device is installed into a junction box.

14. The wiring device covering assembly as in claim 11, further comprising a strap disposed around an exterior portion of said frame.

\* \* \* \* \*